United States Patent [19]
Walduck

[11] Patent Number: 5,866,870
[45] Date of Patent: Feb. 2, 1999

[54] ENHANCED LASER BEAM WELDING

[75] Inventor: Robert Philip Walduck, Northants, England

[73] Assignee: Coventry University, Coventry, England

[21] Appl. No.: 836,973

[22] PCT Filed: Nov. 24, 1995

[86] PCT No.: PCT/GB95/02739

§ 371 Date: Sep. 9, 1997

§ 102(e) Date: Sep. 9, 1997

[87] PCT Pub. No.: WO96/15871

PCT Pub. Date: May 30, 1996

[30] Foreign Application Priority Data

Nov. 24, 1994 [GB] United Kingdom ............... 9423771

[51] Int. Cl.[6] .......................... B23K 10/00; B23K 26/00
[52] U.S. Cl. ............................ 219/121.45; 219/121.46; 219/121.64; 219/121.54
[58] Field of Search ................... 219/121.45, 121.46, 219/121.59, 121.54, 121.57, 121.63, 121.64, 121.85, 121.84

[56] References Cited

U.S. PATENT DOCUMENTS 5,705,785  1/1998  Dykhno et al. ................ 219/121.45

FOREIGN PATENT DOCUMENTS

91101989.8  10/1992  China .
1815085  10/1989  U.S.S.R. .

*Primary Examiner*—Mark H. Paschall
*Attorney, Agent, or Firm*—Oppenheimer Wolff & Donnelly LLP

[57] ABSTRACT

An arc augmented laser welding apparatus has a welding head (10) which comprises a housing (14) a focusing system in the housing for focusing a laser beam through a laser opening in the housing onto a workpiece and a plasma torch nozzle (28) through which a plasma arc is established between an electrode (22) and the workpiece. A first power source (44) applies a high voltage across the electrode and nozzle to strike a pilot arc which is then sustained by power from a second source (42). A third power source (40) applies a high amperage signal to strike the main plasma arc between the electrode and the workpiece. The nozzle has a tip (33) which is adapted to constrict the plasma arc and restrict its impingement on the workpiece. The nozzle and the focusing system are arranged to cause the focused laser beam and the constricted plasma arc to impinge on the workpiece at predetermined relative positions which may coincide or may be slightly spaced apart. The power sources and the laser beam are controlled by a microprocessor in accordance with a predetermined programme in dependence on the type and thickness of material to be welded.

29 Claims, 6 Drawing Sheets

ENHANCED LASER BEAM WELDING

This invention relates to apparatus for welding metals by use of a laser beam enhanced by a plasma arc.

BACKGROUND OF INVENTION

It is known to use both a focussed laser beam and a plasma arc to impinge at the same point on a metal workplace to be welded, but previously some arrangements have been limited to use of free-burning arcs such as the Tungsten-Inert-Gas (TIG) or Metal-Inert-Gas (MIG) type. For example, in UK Patents nos 1547172 and 1600796, Steen discloses the treatment of surfaces by use of a focussed laser beam and a free burning arc, but such an arrangement is difficult to control at start-up (when the arc may root on the nearest electrical ground point) and shut-down, so the results are insufficiently controllable for a commercially applicable process. Further, the use of a free-burning arc results in a relatively large area of workpiece heating compared to the area heated by the laser beam, so the benefits of a narrow heat affected zone are significantly reduced.

In a paper by Walduck and Biffen published in "Welding and Metal Fabrication", April 1994, the advantages of the use of a constricted plasma arc to augment laser welding are described.

CN-A-1065420 discloses an electron beam welding device in which the plasma arc is generated by a plasma gun installed at the lower end of a final-stage vacuum chamber.

SU-A-1 815 085 describes a laser arc processing apparatus for large thickness metal objects. The apparatus has a body, nozzle, an electrode and a lens positioned coaxially with the electrode. To obtain a plasma arc the electrode is hollow and water-cooled and is mounted with a gas vortex unit onto the water-cooled nozzle which is provided with an exit channel of the plasma arc. The lens is located within the electrode cavity and its focal point is positioned at the centre of the nozzle channel to focus the laser at a point in the arc plasma inside the nozzle of the plasma torch. The laser is not used for welding or cutting but to enhance the plasma arc performance without impinging on the workpiece surface. In addition, the body of the plasma torch acts as the electrode for arc formation.

In plasma arc augmented laser welding apparatus it is known to initiate the plasma arc by means of a pilot arc generated by applying a high voltage electrical signal between the electrode and the plasma nozzle but this method has the problem that it causes erosion of the electrode which can affect the plasma arc. Also the initiation of the plasma arc may not be reliable and consistent resulting in an unsatisfactory weld.

SUMMARY OF INVENTION

The present invention provides an improved welding method and apparatus.

Accordingly, the present invention provides a method of welding a workpiece using a plasma arc augmented laser welding apparatus having a laser and a welding head wherein the welding head comprises:
- a plasma torch having a nozzle defining a plasma opening and an electrode disposed inside the torch and extending along the axis of the nozzle towards said opening;
- first means for applying an electrical signal between said nozzle and said electrode for generating a pilot arc therebetween;
- means for applying an electrical signal between said electrode and the workpiece for striking a main plasma arc therebetween;
- and focussing means for focussing the laser beam at the required welding location;

wherein the method comprises commencing the welding process by:
  (a) applying an electrical signal between said electrode and said workpiece at a predetermined first level sufficient to establish a plasma arc between said electrode and said workpiece;
  (b) increasing the amperage of said signal at a preselected rate up to a second preselected level thereby to establish a stable plasma arc;
  (c) energising said laser at a pre-selected time after step (a) above and prior to the establishment of a stable plasma arc;
  (d) commencing relative movement between said welding head and said workpiece so as to cause said welding head to move along a predetermined weld line;

wherein steps (a), (b), (c) and (d) are synchronised such that the establishment of the stable plasma arc, the fill energising of the laser and the commencement of relative movement of the welding head and the workpiece occur at substantially the same time;

and subsequently terminating the welding process by:
  (e) reducing the amperage of said electrical signal at a preselected second rate from said second preselected level until said plasma arc ceases;
  (f) de-energising said laser at a second preselected time after step (e) above; and
  (g) ceasing relative movement of said welding head and said workpiece;

steps (e), (f) and (g) being synchronised such that the cessation of said plasma arc, said laser energy and said relative movement occur at substantially the same time.

The present invention further provides an arc augmented laser welding apparatus having a laser and a welding head, the welding head comprising:
- a housing;
- focussing means in said housing for focussing a laser beam;
- a plasma torch having a nozzle means defining a plasma opening in said housing;
- and an electrode disposed inside the torch;

characterised in that:
- said focussing means focusses said laser beam at a location externally of said housing and on a first axis passing through a laser opening in said housing;
- said electrode extends along an axis of said nozzle means towards said plasma opening for enabling generation of a constricted plasma arc through said plasma opening between said electrode and a workpiece to be welded;

wherein said apparatus further comprises:
  first means (44) constructed, adapted and arranged to generate a first electrical signal between said nozzle means (28) and said electrode (22) and thereby generate a pilot arc therebetween;
  second means (42) constructed, adapted and arranged to generate a second electrical signal between said electrode (22) and said workpiece (12) and thereby maintain said pilot arc after termination of said first signal;
  third means (40) constructed, adapted and arranged to generate a third electrical signal between said electrode (22) and said workpiece (12) and thereby strike and establish a main plasma arc therebetween;

and laser firing means constructed, adapted and arranged to fire the laser to reach its desired energy level during or after the establishment of the stable main plasma arc;

wherein said nozzle means has a tip adapted to constrict said plasma arc thereby to restrict its impingement on said workpiece;

and wherein said first axis and said nozzle means axis are arranged to cause the focussed laser beam and the constricted plasma arc to impinge on said workpiece at predetermined relative positions.

In one arrangement the impingement positions coincide, in alternative arrangements the focussed laser beam either lags or leads the impingement point of the constricted plasma arc by a controllable distance.

Preferably there is also provided means to cause relative movement between the workpiece and said welding head. Preferably the welding head also comprises a second chamber having an outlet, the second chamber being attached to the support means so that the outlet is adjacent the workpiece, and means to connect the second chamber to a source of inert gas. The relative position of the orifice of the plenum chamber and the outlet of the second chamber may be such that the outlet either lags or leads the movement of the orifice relative to a workpiece to be welded.

Optionally there is also provided electromagnetic deflection means adjacent the plasma welding torch to deflect the plasma arc.

Optionally there is also provided a wire guide to supply a filler wire to the beam impingement area of the workpiece, at which there is a molten weld pool.

In one embodiment there is provided means to press the welding head against the surface of a workpiece.

BRIEF DESCRIPTION OF DRAWINGS

The invention will now be described by way of example only with reference to the accompanying drawings in which.

DETAILED DESCRIPTION OF DRAWINGS

Figure 1:
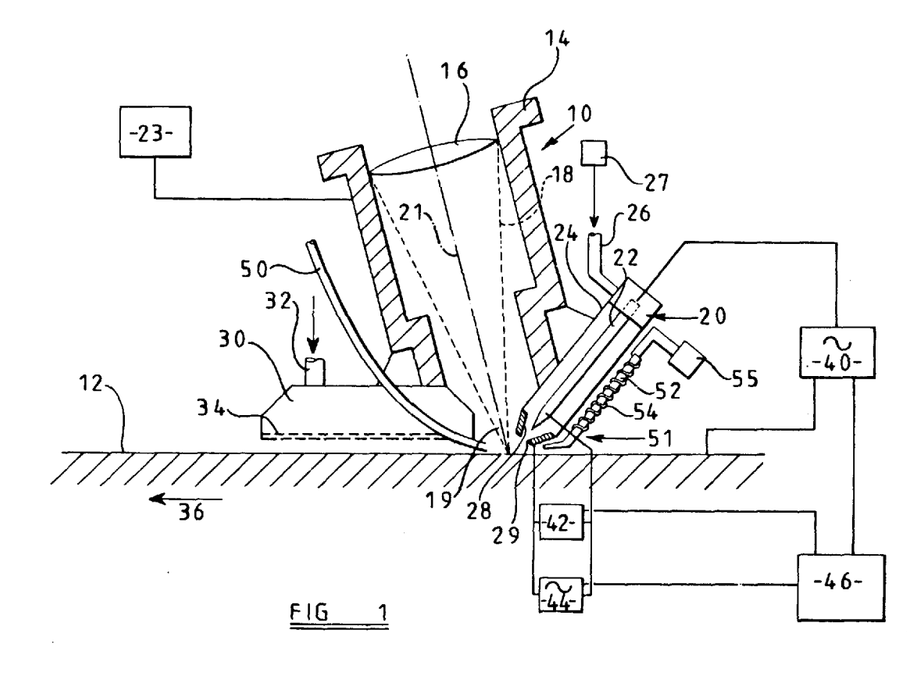
FIG. 1 illustrates schematically a first embodiment of a welding head of an apparatus according to the present invention.

Referring now to FIG. 1, this illustrates, partly in section, a preferred form of welding head 10 for a welding apparatus. The welding head is shown positioned above the surface 12 of a workpiece to be welded.

The welding head 10 comprises a housing 14 of aluminium, brass, austenitic stainless steel or other non-magnetic material which supports a focusing means in the form of a lens 16 made for example of optical glass through which a laser beam 18 can be focused on to the workpiece surface 12.

Forming an integral part of the housing 14 is a plasma welding torch indicated generally by reference 20 which has an electrode 22 surrounded by a plenum chamber 24 to which an inert gas such as argon or helium is supplied under pressure through a tube 26. The body of the plasma torch is water cooled (means not shown).

The plenum chamber 24 terminates at its end adjacent the point of electrode 22 in a water-cooled, interchangeable constricting plasma nozzle 28 (FIG. 7) which is shown schematically. The nozzle has a tip 33 which defines a plasma orifice 29 in the housing which is positioned beyond the electrode tip.

Also attached to the housing 14 on the opposite side to the plasma torch 20 is a separate chamber 30 to which an inert gas is supplied under pressure through a tube 32. The separate chamber 30 has an open side of a substantial area covered by a diffuser mesh 34.

A drive means 23 is provided to cause relative movement of the welding head 10 and the surface 12, as indicated by arrow 36, conveniently by driving the welding head along the workpiece surface 12.

The laser beam is directed along a first axis 21 through a laser opening 19 in the housing to be focused on the workpiece surface 12.

A first means in the form of an electrical power source 44 is connected to the electrode 22 and the nozzle 28 to apply a first signal across the electrode tip and the orifice 28 to strike a pilot arc across these. This first electrical signal is a high frequency or impulse, high voltage signal which is merely used to initiate the pilot arc. Once the pilot arc is initiated, it is maintained as a low amperage pilot arc by a second means in the form of a low current dc supply 42. In practice, the high voltage source 44 initiates the pilot arc using current from the source 42 which then maintains the pilot arc at a lower voltage level.

A third means in the form of an electrical power source 40 provides either dc or variable polarity current (VPPA) for the main plasma arc.

The pilot arc is on the whole time the welding apparatus is in use, or awaiting use when the main plasma arc is not being generated. The inert gas flows through the plasma nozzle 28, "blowing" the pilot arc outwardly from the nozzle towards the workpiece surface 12. The pilot arc joins the gap between the nozzle and the workpiece surface to provide a conducting path for the main current flow so that when the main power is applied from the electrical source 40 the main plasma arc is formed quite easily.

Figure 7:
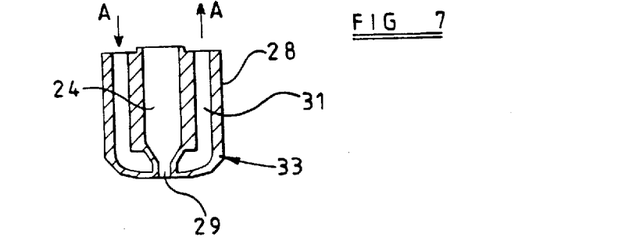
FIG. 7 is a longitudinal section through a plasma nozzle for a welding apparatus according to the present invention.

The tip of the electrode 22 is positioned "behind" the orifice 29 of the nozzle 28 i.e. the tip of the electrode does not project into the orifice 29. The orifice itself is constricted and shaped so as to constrict the plasma arc severely and to create a generally columnar arc which impinges on only a relatively small area of the workpiece surface 12. One example of the plasma nozzle 28 is shown in FIG. 7. The orifice 29 is generally cylindrical. The length/diameter ratio of the orifice 29 is less than 2:1 and is preferably in the range 1.5:1 to 0.5:1, a preferred ratio being 1:1 or 1.2:1. The nozzle also has passages 31 for the flow of coolant such as water which flows in the direction of arrows A. This cooling conducts heat away from the nozzle orifice 29 and provides a much longer working life for the nozzle.

In the illustrated welding head the chamber 24 is preferably formed integral with the housing 14. The axis 21 of the laser opening 19 and the axis of the nozzle 28 are aligned such that the laser beam is focused on the workpiece surface at the same location where the constricted plasma arc impinges as a result of which the plasma arc augments the laser heating of the surface 12. Small adjustments may be made to allow pre-set positioning, and the interchangeable orifice can be selected to be of appropriate size and current capacity.

The laser opening and the plasma nozzle may be arranged to cause the laser beam to focus at a point on the workpiece surface which is spaced from the point of impingement of the constricted plasma arc, if desired. The spacing maybe chosen to suit particular welding requirements and materials.

The above-described arrangement may be used for various types of welding including fusion welding as performed autogenously, homogenously and hetrogenously; braze welding; weld surfacing, and simultaneous reflow welding.

The coimpingement of the constricted plasma arc and the laser beam focus provides a synergistic heating effect, producing a larger volume of molten weld pool than the sum of the two separate processes. In some circumstances it may be advantageous for the root of the plasma arc on the workpiece to precede or lead the laser beam focus by a small, pre-set distance as the workpiece surface 12 moves relatively to the welding head.

The use of a constricting orifice 28 has the advantage of protecting the electrode 22 from metal vapours and other vaporised contaminants, and from the consequential arc instability resulting from electrode contamination. The infrequent use of the high voltage, high frequency or impulse current source 42 for starting the pilot arc reduces the extent of etching of the point of electrode 22, resulting in a significantly increased service life compared with TIG arc augmentation welding. The use of a pilot arc to initiate the main welding arc provides reliable and controllable conditions for weld start-up. The sequence of start-up of the plasma arc, laser beam, and welding motion at initiation and termination of welding is critical and should be controlled by a microprocessor, shown schematically at 46. The microprocessor may also be used to control the plasma arc operating parameters.

Figure 8:
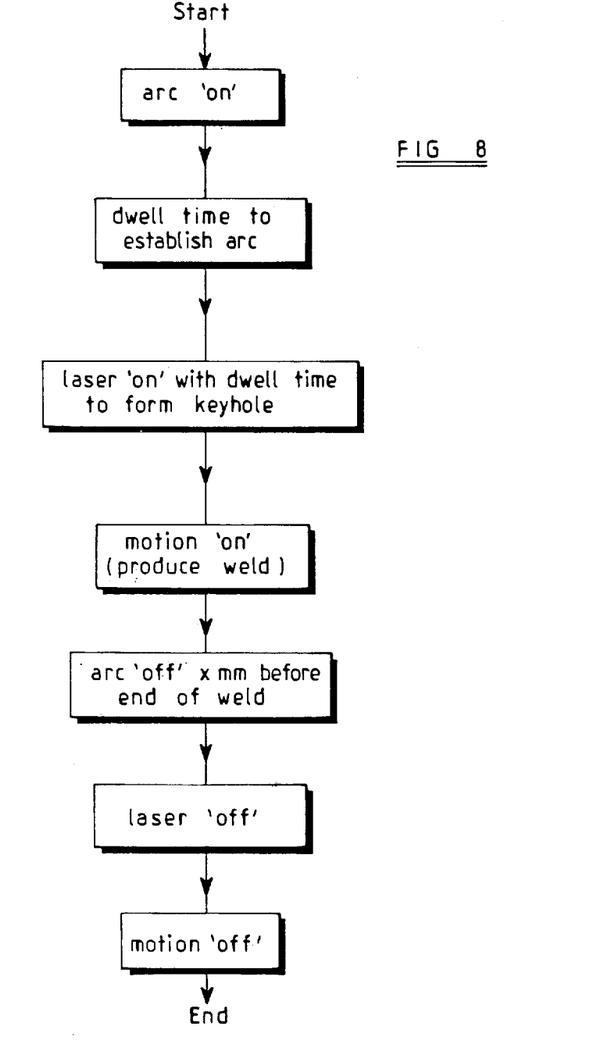
FIG. 8 is a flow chart illustrating the sequence of operations carried out during a welding process.

A sequence of a welding operation is now described with reference to FIGS. 8 and 9. When the welding apparatus is first switched on in order to commence a number of welding jobs, the power source 44 applies a high voltage signal across the electrode tip and the nozzle orifice 29 to initiate the pilot arc. The high voltage is then removed to leave the pilot arc sustained by the low current supplied from the power source 42. Tis pilot arc remains "on" for the whole of the working time of the welding apparatus, regardless of whether or not the main plasma arc is on.

In order to carry out a welding job the operator turns on the inert gas supply to the chamber 24 if not already on, the gas being forced out of the chamber through the orifice 29 and blowing the pilot arc outwardly, in a "bow" effect to assist in the ionising of the surrounding gases.

At time $t_1$ the power source 40 is energised to apply a high amperage signal between the electrode tip and the workpiece surface 12 to strike the main plasma arc. The current supplied by the power source 40 is allowed to increase in a generally linear fashion from switch on of the power source 40 to the establishment of full plasma arc power at time $_3$. It can be seen from FIG. 9 that plasma arc energy builds up over a period of time to a stable arc condition. This time is normally measured in milliseconds and is chosen normally in dependence on the thickness and type of the material being welded. The time $t_1$ to $t_3$ is controlled by the microprocessor 46. This control prevents over-penetration and excessive melting of the workpiece material at the start of the weld line. At a predetermined time $t_2$ during the build up of the plasma arc energy applied by the power source 46, the laser is fired. The laser energy builds up very rapidly, over a period of microseconds, until the laser attains its maximum energy at time $t_4$. The laser energy also increases linearly, in a similar manner to that of the plasma arc energy, although the increase in energy of the plasma arc need not be linear. The laser rapidly attains an energy level at which complete penetration of the metal workpiece is attained.

Figure 9:
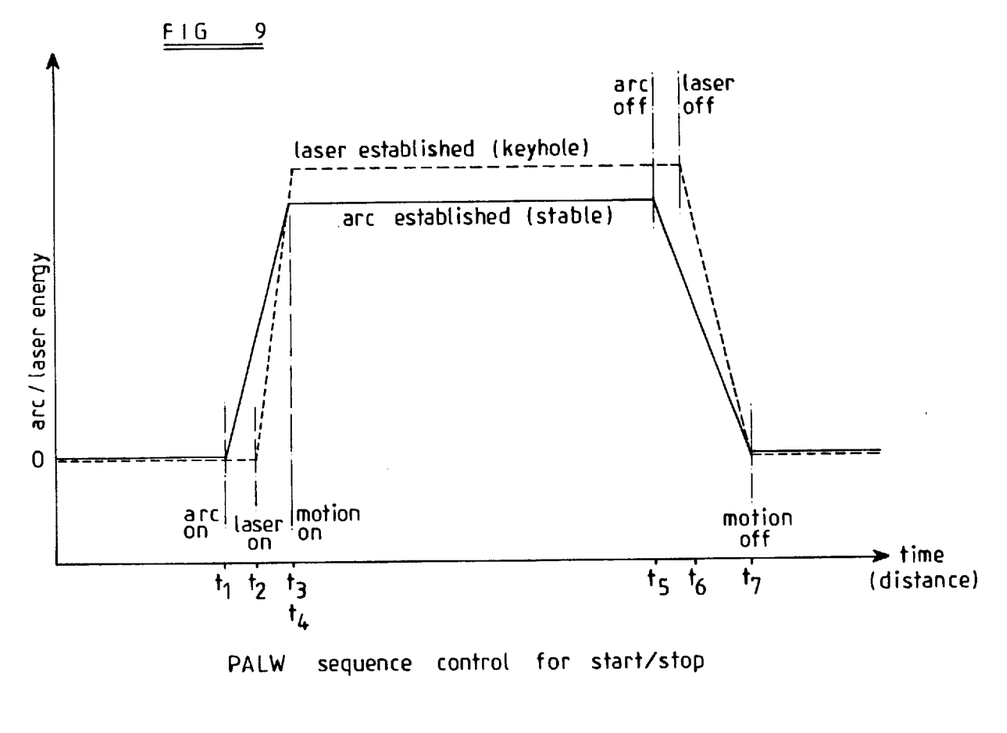
FIG. 9 is a graph illustrating the relationship between the plasma arc energy, laser energy and welding time during the welding operation of FIG. 8.

As can be seen from FIG. 9, time $t_3$ and $t_4$ coincide in time but this need not be the case and the laser can be controlled to reach its preselected energy level either before or after time $t_3$. In addition, FIG. 9 shows the laser energy being established at a level above the plasma arc energy and although this is preferred, it is not necessarily always the case and the laser energy can be established at a level below the plasma arc energy level.

Relative movement of the welding head and the workpiece surface is controlled by the microprocessor to commence when the plasma arc reaches its stable energy level at time $1/t_4$, the welding head normally being driven by the drive means 23, although it is possible for the welding head to be maintained stationary and the workpiece to be moved past the welding head.

If the firing of the plasma arc and the laser are not synchronised with each other and the commencement of relative motion between the welding head and the workpiece surface, erratic and unsatisfactory welds can result.

Movement of the welding head along the weld line then continues over the time $t_3/t_4$ to time $t_5$. At time $t_5$, just before the end of the weld line, the power supplied by the power source 46 to maintain the plasma arc is reduced . This reduction continues until the arc terminates at time $t_7$. The time elapsing between times $t_5$ and $t_7$ is again measured in milliseconds.

At a preselected time $t_6$ between times $t_5$ and $t_7$ the laser is switched off, allowing the laser energy to degenerate to zero at time $t_7$, this normally occurring in microseconds.

At time $t_7$ relative movement of the welding head and the workpiece is also stopped.

This controlled termination of the welding process prevents over melting of the metal workpiece and ensures a proper completion of the weld.

An incorrect shut-down sequence or inaccurate phase-out between the laser and the plasma arc can result in incomplete fusion or over melting and possibly melt through of the workpiece at the end of the weld.

The above-described control of the plasma arc and laser are controlled by the microprocessor 46 and enable a consistent weld to be produced.

The sequence of events and timing of the above-described welding process can vary in dependence on the thickness and type of material being welded and the microprocessor can be provided with predetermined control programmes in dependence on this.

As the surface 12 and the welding head 10 are moved relative to one another, the inert gas provided to secondary chamber 30 blankets the hot metal after the plasma augmented laser welding process, preventing oxidation and contamination, and thus helping to ensure a good weld quality.

The welding head 10 illustrated in FIG. 1 has the optional feature of a wire guide 50 through which a consumable wire may be supplied to the surface 12 at the impingement point. This is used in a welding process requiring the supply of a filler metal into the weld pool at the impingement point.

A second optional feature illustrated in FIG. 1 is the provision of magnetic means for deflection of the main plasma arc. One or more ferrous metal deflector pole pieces 52, each comprising a metal core closely adjacent the welding torch 20 and orifice 28, are wound with coils 54 to form electromagnets. Only one such pole piece and coil is illustrated. The coils are connected to a current source 55.

Provision of an electric current of appropriate magnitude, frequency and wave form to the coils 54 generates a magnetic field in the vicinity of the chamber 24 and especially the orifice 28, and this field interacts with the arc, which is a current-carrying gaseous conductor.

If a direct current is supplied to coil 54, the plasma arc is deflected statically by an amount proportional to the strength of the magnetic field developed in the pole pieces 52 and to the length of the arc. An alternating current can cause the arc to oscillate transversely across a weld joint line with an amplitude of deflection determined by the strength of magnetic field and the arc length.

Oscillation of the arc improves the welding tolerance to fit-up gaps at the weld joint line when butt or seam welding, while maintaining good welding conditions, and is particularly useful in the autogenous welding of sheet-gauge metals. Gaps of up to 30% of the thickness of the sheet material being welded can be tolerated. The magnetic oscillation facility provided by coils 54 is particularly useful when joint fit-up conditions are poor, the oscillation of the constricted plasma arc providing additional tolerance.

When the head shown in FIG. 1 is used for autogenous seam welding of butt or lap joints, the position of the plasma torch 20 is pre-set so that the constricted plasma arc roots on the surface 12 at the point coincident with or in advance of the focus of the laser beam, considering the direction of movement of surface 12.

Such welds can be made at relatively high speeds, and a chamber 30 is used to provide a trailing gas shield. The inert gas protects the weld from atmospheric contamination.

Figure 2:
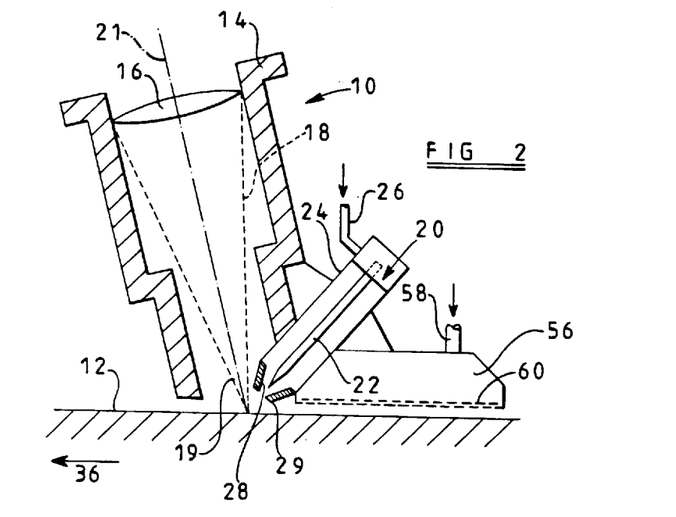
FIG. 2 illustrates schematically a second embodiment of a welding head suitable for simultaneous heat treatment of a weld.

When the head shown in FIG. 1 is used for braze welding, weld surfacing or non-autogenous seam welding, a filler metal wire must be supplied through the wire guide 50. FIG. 2 illustrates a second embodiment of the invention. Parts identical to those in FIG. 1 are given identical reference numerals, and the electrical sources are not illustrated.

In this arrangement there is a secondary chamber 56 supplied with inert gas through a tube 58 and having a diffuser mesh 60. The chamber 56 is positioned on the same side of the head 10 as the plasma torch 20. The chamber 56 constitutes a trailing shield for the weld. This arrangement is especially suitable for re-flow welding or welding with simultaneous heat treatment when the plasma arc is used to post-heat the weld metal to control the cooling rate.

Figure 3:
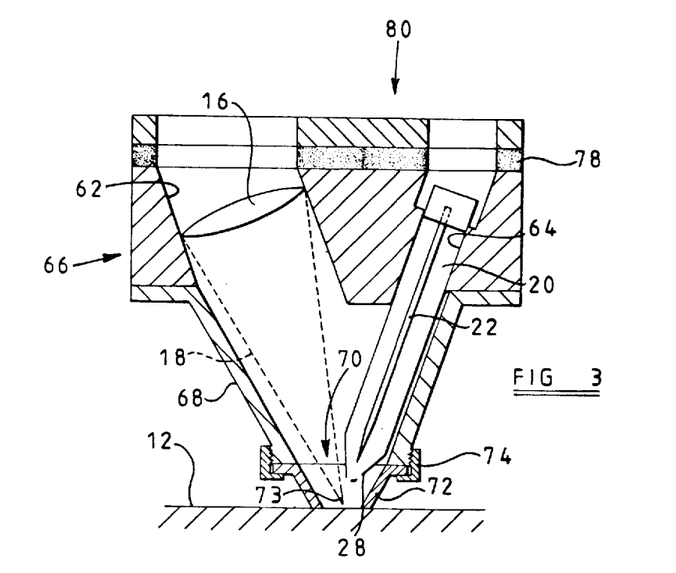
FIG. 3 illustrates schematically in part section a welding head suitable for spot welding.

Subsequently-described embodiments are especially applicable to plasma arc augmented laser spot welding. FIG. 3 illustrates a suitable embodiment incorporating a plasma torch 20 and laser beam focusing lens 16 as before, but now supported within a suitably configured housing 62, 64 in a solid weld head 66. The head 66 has a conical extension 68 with an aperture 70, at the lower end of which a conical shield gas cup is held by threaded cap 74. The internal surface of the cup 72 is coated with a ceramic coating.

At the end of the weld head 66 remote from the extension 68 there is a gasket 78 of compliant material such as rubber or neoprene.

In use, physical pressure is applied to the weld head 66 in the direction of the arrow 80 to press the shield gas cup 72 against a workpiece surface 76. The lens 16 is arranged to focus the laser beam on the surface, and the plasma torch 20 is positioned so that a plasma arc roots on the surface 76 at the focus of the laser beam.

The pressure on the workpiece is sufficient to keep the overlapping parts of two surfaces to be joined in good contact and in close proximity to the plasma arc root. This permits the head to be used for spot welding.

The shield gas cup 72 is made of a non-magnetic material which has a high thermal conductivity combined with good tensile strength. The cup will then withstand the high temperature and pressure conditions associated with the repeated cycling of spot welding, and the internal ceramic layer reduces the incidence of metal spatter (small globules of molten work metal expelled from the weld pool) adhering to the inside of the cup.

The use of an elastomeric gasket gives electrical isolation between the head and its mounting, and a small amount of flexibility in the contact between the cup 72 and the surface 76.

The use of a detachable cup 72 allows it to be replaced periodically.

The end of the conical extension 68 to which the cup 72 is attached is provided with water cooling. This is to provide satisfactory functional performance and service life of the cup 72.

Figure 4:
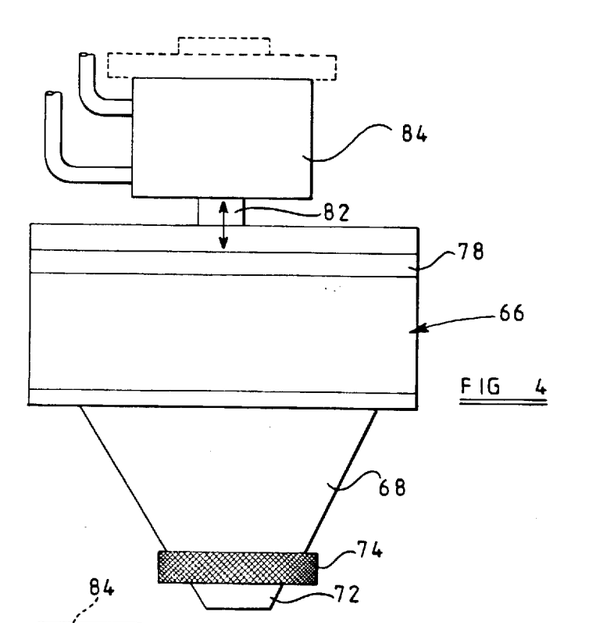
FIG. 4 illustrates an external view of an apparatus including a head as shown in FIG. 3.

FIG. 4 shows the head 66, cup 72 and threaded retaining ring 74 attached to the pressure ram 82 of a pneumatic or hydraulic cylinder 84. The ram is activated to position the cup 72 on the surface 76, and apply the required pressure, then retract to allow repositioning at the next weld point.

Such apparatus can be used for spot welding when access to the workpiece is possible from one side only.

Figures 5, 6:
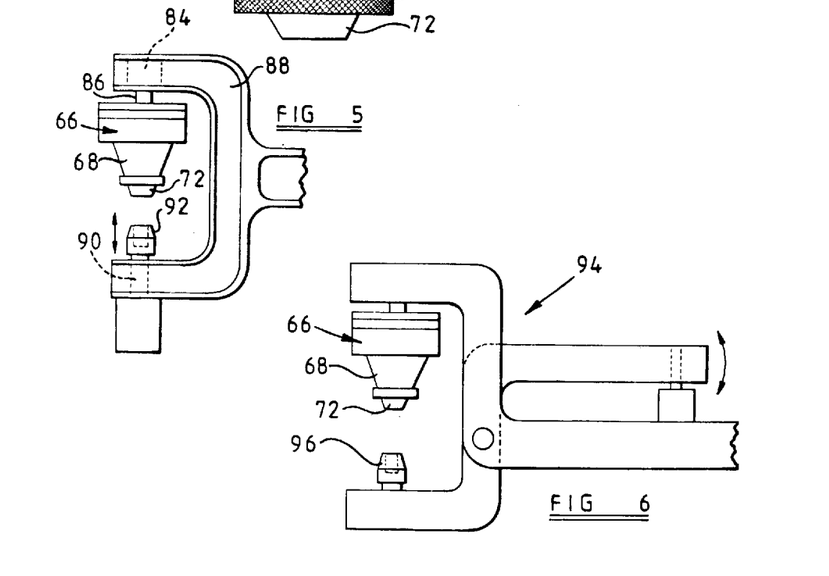
FIGS. 5 and 6 illustrate two possible configurations of welding apparatus incorporating the welding head shown in FIGS. 3 and 4.

If access to a workpiece to be spot welded is possible from both sides, either of the arrangements shown in FIGS. 5 and 6 can be used.

In FIG. 5, the weld head 66 with its cup 72 is held on a fixed shank 86 attached to the upper part of a "C" frame 88; the lower part of the frame supports a ram 90 carrying a pressure ring 92 by which pressure can be applied upwardly to a workpiece (not shown) positioned between the cup 72, to allow spot welding.

In FIG. 6, the weld head 66 with its cup 72 is held on the upper part of a scissor gun 94, and a pressure ring 96 is held on the lower part. Operation of the scissor gun applies pressure to a workpiece between the cup 72 and pressure ring 96.

Other possible variations, not illustrated, include the provision of the laser beam through an optical fibre supply system.

Figure 10:
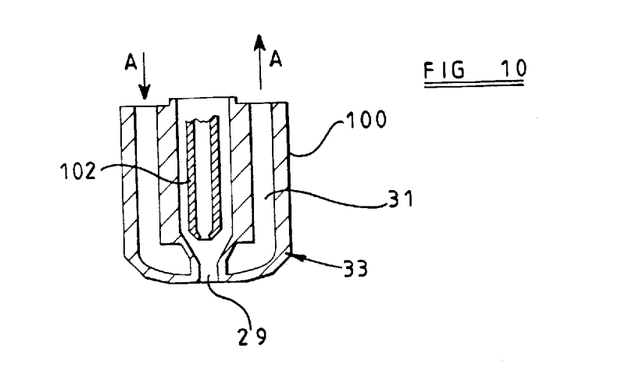
FIG. 10 is a schematic diagram of a further embodiment of a welding head for an apparatus according to the present invention.

FIG. 10 shows a modification to the welding head of FIG. 1 in which both the laser beam and plasma arc are applied through an orifice of a common nozzle 28. As can be seen, the electrode 22 is hollow and the laser beam is focussed down the centre of the electrode, concentric with the plasma arc generated between the tip of the electrode and the workpiece surface.

A welding head according to the invention, especially by reason of its microprocessor control system, may be used whenever carefully controllable welds are required, for example in automated or robotic welding operations, when consistent sequencing and control of the laser beam, plasma arc, and welding motion is essential.

I claim:

1. A method of welding a workpiece using a plasma arc augmented laser welding apparatus having a laser and a welding head wherein the welding head comprises:

a plasma torch having a nozzle defining a plasma opening and an electrode disposed inside the torch and extending along the axis of the nozzle towards said opening;

first means for applying an electrical signal between said nozzle and said electrode for generating a pilot arc therebetween;

means for applying an electrical signal between said electrode and the workpiece for striking a main plasma arc therebetween;

and focussing means for focussing the laser beam at the required welding location;

wherein the method comprises commencing the welding process by:

(a) applying an electrical signal between said electrode and said workpiece at a predetermined first level sufficient to establish a plasma arc between said electrode and said workpiece;

(b) increasing the amperage of said signal at a preselected rate up to a second preselected level thereby to establish a stable plasma arc;

(c) energising said laser at a pre-selected time after step (a) above and prior to the establishment of a stable plasma arc;

(d) commencing relative movement between said welding head and said workpiece so as to cause said welding head to move along a predetermined weld line;

wherein steps (a), (b), and (c) are synchronised such that the establishment of the stable plasma arc, the full energising of the laser and the commencement of relative movement of the welding head and the workpiece occur at substantially the same time;

and subsequently terminating the welding process by:

(e) reducing the amperage of said electrical signal at a preselected second rate from said second preselected level until said plasma arc ceases;

(f) de-energising said laser at a second preselected time after step (e) above; and (g) ceasing relative movement of said welding head and said workpiece;

steps (e), (f) and (g) being synchronised such that the cessation of said plasma arc, said laser energy and said relative movement occur at substantially the same time.

2. A method as claimed in claim 1 which further comprises prior to step (a), the steps of:

applying a high voltage electrical signal between the nozzle and the electrode thereby to strike a pilot arc therebetween;

and then removing said high voltage electrical signal and applying a low current electrical signal between the electrode and the nozzle thereby to maintain said pilot arc ready for the establishment of a main plasma arc.

3. An arc augmented laser welding apparatus having a laser and a welding head, the welding head comprising:

a housing;

focussing means in said housing for focussing a laser beam;

a plasma torch having a nozzle means defining a plasma opening in said housing;

and an electrode disposed inside the torch;

wherein:

said focussing means focusses said laser beam at a location externally of said housing and on a first axis passing through a laser opening in said housing;

said electrode extends along an axis of said nozzle means towards said plasma opening for enabling generation of a constricted plasma arc through said plasma opening between said electrode and a workpiece to be welded;

wherein said apparatus further comprises:

first means constructed, adapted and arranged to generate a first electrical signal between said nozzle means and said electrode and thereby generate a pilot arc therebetween;

second means constructed, adapted and arranged to generate a second electrical signal between said electrode and said workpiece and thereby maintain said pilot arc after termination of said first signal;

third means constructed, adapted and arranged to generate a third electrical signal between said electrode and said workpiece and thereby strike and establish a main plasma arc therebetween;

and laser firing means constructed, adapted and arranged to fire the laser to reach its desired energy level during or after the establishment of the stable main plasma arc;

wherein said nozzle means has a tip adapted to constrict said plasma arc thereby to restrict its impingement on said workpiece;

and wherein said first axis and said nozzle means axis are arranged to cause the focussed laser beam and the constricted plasma arc to impinge on said workpiece at predetermined relative positions.

4. A welding apparatus as claimed in claim 3 further comprising control means adapted to control the laser; said first means, second means and said third means to cause a sequence of operations in which:

(a) the first means applies a high voltage electrical signal between the electrode and the nozzle to strike a pilot arc between them;

(b) the means then removes the high voltage signal and the second means applies a low current electrical signal between the electrode and the nozzle to maintain said pilot arc;

(c) with the pilot arc maintained, the second means applies a high amperage electrical signal between the electrode and the workpiece to be welded to strike a plasma arc between them;

(d) the third means increases the amperage of said signal thereby to establish a stable plasma arc; and (e) the laser is energised to cause the laser beam focussed at the required welding location to reach its required energy level during or after the establishment of the stable plasma arc.

5. A welding apparatus as claimed in claim 3 wherein said predetermined relative positions coincide.

6. A welding apparatus as claimed in claim 3 wherein said plasma opening is an orifice forming a restricted opening thereby to protect said electrode from hot metal vapors and gases formed during welding.

7. A welding apparatus as claimed in claim 6 wherein said nozzle means is adapted to shape the plasma arc into substantially columnar form.

8. A welding apparatus as claimed in claim 6 wherein said orifice is substantially cylindrical and has an axial length to diameter ratio of less than 2:1.

9. A welding apparatus as claimed in claim 8 wherein said length to diameter ratio is in the range 0.5:1.5.

10. A welding apparatus as claimed in claim 8 wherein said length to diameter ratio is in the range 1.2:1 to 1:1.

11. A welding apparatus as claimed in claim 3 wherein said nozzle means has passages formed therein for the passage of coolant thereby to enable cooling of the nozzle means.

12. A welding apparatus as claimed in claim 11 wherein said cooling passages extend into the tip of the nozzle means thereby to provide efficient cooling of said tip.

13. A welding apparatus as claimed in claim 3 having a source of pressurised gas and wherein said nozzle means is adapted to receive said gas and direct said gas outwardly of said nozzle means through said plasma opening.

14. A welding apparatus as claimed in claim 3 further comprising electromagnetic means adjacent said nozzle means and energisable to deflect said plasma arc in a predetermined manner.

15. A welding apparatus as claimed in claim 14 wherein said electromagnetic means has a power source for applying an alternating signal to said electromagnetic means thereby to cause said plasma arc to deflect laterally in an oscillating manner in response to said signal.

16. A welding apparatus as claimed in claim 3 wherein said first means is operable to apply a high voltage signal between said electrode and said nozzle means over a preselected period of time thereby to generate said pilot arc and said second means is operable to apply a low current DC signal between said electrode and said nozzle means thereby to maintain said pilot arc.

17. A welding apparatus as claimed in claim 3 wherein said third means is operable to apply a high amperage signal between said electrode and said workpiece whereby to generate said main plasma arc therebetween.

18. A welding apparatus as claimed in claim 3 wherein said housing is made of a non-magnetic material.

19. A welding apparatus as claimed in claim 18 wherein said housing is made of a material selected from the group comprising of aluminium, brass and austenitic stainless steel.

20. A welding apparatus as claimed in claim 3 further comprising a chamber coupled to said housing for receiving a supply of inert gas, said chamber being positioned so as to direct said gas over an area adjacent said laser opening and said plasma opening to provide a trailing gas shield for protecting the weld from atmospheric contamination.

21. A welding apparatus as claimed in claim 20 wherein said chamber is provided with diffuser means for diffusing said gas over said workpiece adjacent said laser opening and said plasma opening.

22. A welding apparatus as claimed in claim 3 wherein said plasma opening also serves as said laser opening;

and said focussing means is adapted to direct said laser beam through said plasma opening substantially coaxially with said plasma arc.

23. A welding apparatus as claimed in claim 22 wherein said electrode is cylindrical having an open end adjacent said plasma opening;

and wherein said focussing means is adapted to direct said laser beam coaxially through said electrode.

24. A welding apparatus as claimed in claim 3 wherein;

said housing is provided with an extension forming said laser opening;

said nozzle means is positioned within said housing and behind said laser opening whereby said plasma arc is arranged to extend through said laser opening;

and wherein an internal surface of said housing extension adjacent said laser opening is provided with a ceramic layer.

25. A welding apparatus as claimed in claim 24 wherein:

said extension is terminated by a frusto-conical cup which has an aperture through which said laser and said plasma arc are directed;

and said welding head is resiliently supported for enabling contact of said cup with said workpiece for the welding thereof.

26. A welding apparatus as claimed in claim 25 wherein said cup is made of non-magnetic material having a high thermal conductivity.

27. A welding apparatus as claimed in claim 26 wherein said cup is detachably mounted on said extension.

28. A welding apparatus as claimed in claim 25 wherein said cup has passage means therein for the circulation of coolant.

29. A welding apparatus as claimed in claim 3 further comprising microprocessor means for controlling said laser and said first means, second means and third means in accordance with a pre-programmed routine.

* * * * *